US005579496A

United States Patent [19]

Van Steenbrugge

[11] Patent Number: 5,579,496

[45] Date of Patent: Nov. 26, 1996

[54] METHOD AND APPARATUS FOR PROCESSING CONTROL INSTRUCTIONS RECEIVED FROM MULTIPLE SOURCES CONNECTED TO A COMMUNICATION BUS

[75] Inventor: Bernard Van Steenbrugge, Redhill, United Kingdom

[73] Assignee: U.S. Phillips Corporation, New York, N.Y.

[21] Appl. No.: 483,629

[22] Filed: Jun. 7, 1995

Related U.S. Application Data

[63] Continuation of Ser. No. 209,681, Mar. 10, 1994, abandoned, which is a continuation of Ser. No. 853,366, Mar. 18, 1992, abandoned.

[30] Foreign Application Priority Data

Apr. 2, 1991 [EP] European Pat. Off. .............. 91200758

[51] Int. Cl.$^6$ .............................. G09G 3/02; G05B 19/00

[52] U.S. Cl. .................... 395/567; 340/825.22; 345/158; 345/169; 348/734

[58] Field of Search ............................ 364/138; 358/194; 345/158; 395/375

[56] References Cited

U.S. PATENT DOCUMENTS

| | | | |
|---|---|---|---|
| 3,947,849 | 3/1976 | Fehlmer et al. | 342/389 |
| 4,040,031 | 8/1977 | Cassomet | 395/250 |
| 4,209,838 | 6/1980 | Alcorn, Jr. et al. | |
| 4,236,203 | 11/1980 | Curley et al. | |
| 4,482,947 | 11/1984 | Zato et al. | 364/138 |
| 4,751,581 | 6/1988 | Ishiguro et al. | 368/194.1 |
| 4,897,718 | 1/1990 | Testr et al. | 358/194.1 |
| 4,897,834 | 1/1990 | Peterson et al. | 370/85.1 |
| 4,969,146 | 11/1990 | Twitty et al. | 370/85.1 |
| 5,128,789 | 7/1992 | Abramovitz | 359/118 |
| 5,132,679 | 7/1992 | Kubo et al. | 340/825.22 |
| 5,367,316 | 11/1994 | Ikezaki | 345/158 |

FOREIGN PATENT DOCUMENTS

| | | | |
|---|---|---|---|
| 0071296 | 2/1983 | European Pat. Off. . | |
| 0137225 | 4/1985 | European Pat. Off. . | |
| 0165600 | 12/1985 | European Pat. Off. . | |
| 0423739 | 4/1991 | European Pat. Off. | H04B 1/20 |
| 582343 | 2/1994 | European Pat. Off. | H09B 1/20 |
| 2900380 | 7/1979 | Germany . | |

OTHER PUBLICATIONS (The D2B Concept) Of The User Manual Of Single-Chip 8-Bit Microcontrollers, Published By Philips Electronics Components And Materials, 1986, pp. 551-609.

*Primary Examiner*—William M. Treat
*Assistant Examiner*—Saleh Najjar
*Attorney, Agent, or Firm*—Laurie E. Gathman

[57] ABSTRACT

In a communication system comprising different apparatuses which are coupled together by a bus, a control instruction, for example, a remote control command may be passed on by a plurality of apparatuses to the apparatus performing the instruction. In order that the apparatus performs such an instruction only once, the control circuit in the apparatus memorizes from which source the performed instruction has been received. The identical control instructions received from the other apparatuses are ignored for a predetermined period of time.

8 Claims, 4 Drawing Sheets

METHOD AND APPARATUS FOR PROCESSING CONTROL INSTRUCTIONS RECEIVED FROM MULTIPLE SOURCES CONNECTED TO A COMMUNICATION BUS

This is a continuation of application Ser. No. 08/209,681, filed Mar. 10, 1994, which is a continuation of application Ser. No. 07/853,366, filed on Mar. 18, 1992, both now abandoned.

BACKGROUND OF THE INVENTION

The invention relates to a method of processing control instructions received from at least two identifiable sources via a communication connection. Such a method can be used, inter alia, in apparatuses which are coupled together by use of a bus. These may be audio and video apparatuses, but aim, for example washing machines, microwave ovens, luminaires and the like.

The invention also relates to an apparatus provided with a control circuit adapted to perform the method.

Lately, apparatuses have been provided with a connection for coupling them to a common bus. By use of this bus a plurality of apparatuses can be operated from one point in the house. It is also possible to transmit all kinds of control instructions from each apparatus to any other apparatus which is connected. An example of such a bus is known under the name of Domestic Digital Bus (frequently abbreviated to D2B bus) which is described, for example, in chapter 11 (The D2B Concept) of the User Manual of Single-Chip 8-bit Microcontrollers, published by Philips Electronic Components and Materials, 1986. The D2B bus provides easy operation of, for example, an audio/video system including a plurality of apparatuses. For example, a video recorder may automatically switch on a television receiver and tune this receiver to the correct video recorder channel when a video tape is to be displayed.

Apparatuses having a D2B connection will often also have their own infrared receiver so that they can also be used as stand-alone apparatuses. Such apparatuses may be implemented in such a way that a control instruction which has been received by the infrared receiver and cannot be carried out by the apparatus itself is passed on via the D2B bus to an apparatus which does have the required facilities. The latter apparatus then need not have an infrared receiver of its own, or it may be accommodated in a closed space. If more apparatuses having theft own infrared receivers are coupled together via the D2B bus, a problem arises which will now be illustrated with reference to an example. An audio/video system comprises a video recorder, a television monitor and an audio amplifier with loudspeakers. The video recorder, provided with an infrared receiver, receives the operating command "volume up" from an infrared transmitter for increasing the sound volume by one step, but it cannot carry out this command itself because it lacks a built-in audio amplifier section. The same applies to the television monitor which is also provided with an infrared receiver. In a previously performed installation phase both apparatuses have been programmed to pass on control instructions relating to sound functions via the D2B bus to the audio amplifier accommodated in a cabinet. The apparatuses will attempt to do this simultaneously or substantially simultaneously. In response to an arbitration procedure described in the Reference the two instructions will be passed on to the audio amplifier one after the other. The audio amplifier now receives the control instruction "volume up" from both apparatuses and will carry out the two instructions. The result is that the volume is raised by two steps, which may generally not have been the user's intention. If the user keeps the "volume up" key on the infrared hand-held remote control unit depressed, this operating command is generated in a repetitive manner and both apparatuses will pass on the corresponding control instruction also in a repetitive manner to the audio amplifier. The volume will now be raised twice faster than is desirable.

Apparatuses passing on a control instruction to another connected apparatus via the D2B bus will hereinafter be referred to as sources. The apparatus for which these control instructions are intended is provided with a control circuit receiving and processing the control instructions. It is to be noted that the control circuit can identify the source of a control instruction. For this purpose, and as indicated in the Reference, each "D2B message" on the bus does not only include the control instruction and a "slave address" (with which the apparatus is addressed) ·but also a "master address" which identifies the source of the message.

SUMMARY OF THE INVENTION

It is an object of the invention to provide a method preventing the unwanted consequences of identical control instructions which have been received more than once.

To this end the method according to the invention is characterized in that, upon execution of a control instruction, an instruction code corresponding to the executed control instruction and a source code corresponding to the source thereof are stored upon reception of a control instruction, an instruction code corresponding to the received control instruction is compared with the stored instruction code, and if they match the source code corresponding to the source of the received control instruction is determined and checked whether the source code matches the stored source code. The execution of the received control instruction is omitted if the source code does not match the stored source code. It is thereby achieved that from a series of identical control instructions from different sources only the instruction is carried out from the source whose source code was already stored. The control instructions from the other sources are redundant and are ignored. If repetitive control instructions are received, only the instructions from the one and the same source is carded out.

A further embodiment of the method is characterized in that execution of the received control instruction is omitted if also less than a predetermined period of time has elapsed since the reception of the control instruction executed before. In that case the control instruction from the transmitter whose control instruction is received first after the predetermined period of time has elapsed will be performed.

Another embodiment of the method is characterized in that the source code corresponding to the source of the received control instruction is also stored if the execution of the control instruction is omitted and in that the source codes corresponding to the other sources are erased when the control instruction is being executed. The effect achieved thereby will be explained with reference to an example. Let it be assumed that of a series of identical control instructions from different transmitters the instruction from transmitter A is executed and the instruction from transmitter B is ignored. It is now possible that the instruction from transmitter A is absent in a subsequent series of control instructions, for example, because the infrared receiver of the corresponding apparatus was temporarily covered. It is also possible that the control instruction from transmitter A in the subsequent series is received later than the control instruction from transmitter B, for example, because transmitter A has lost the previously mentioned arbitration procedure. Of the subsequent series, the control instruction from transmitter B is now performed. Thus, each control instruction is performed actually and without any delay.

DETAILED DESCRIPTION OF THE PREFERRED EMBODIMENTS OF THE INVENTION

Figure 1:
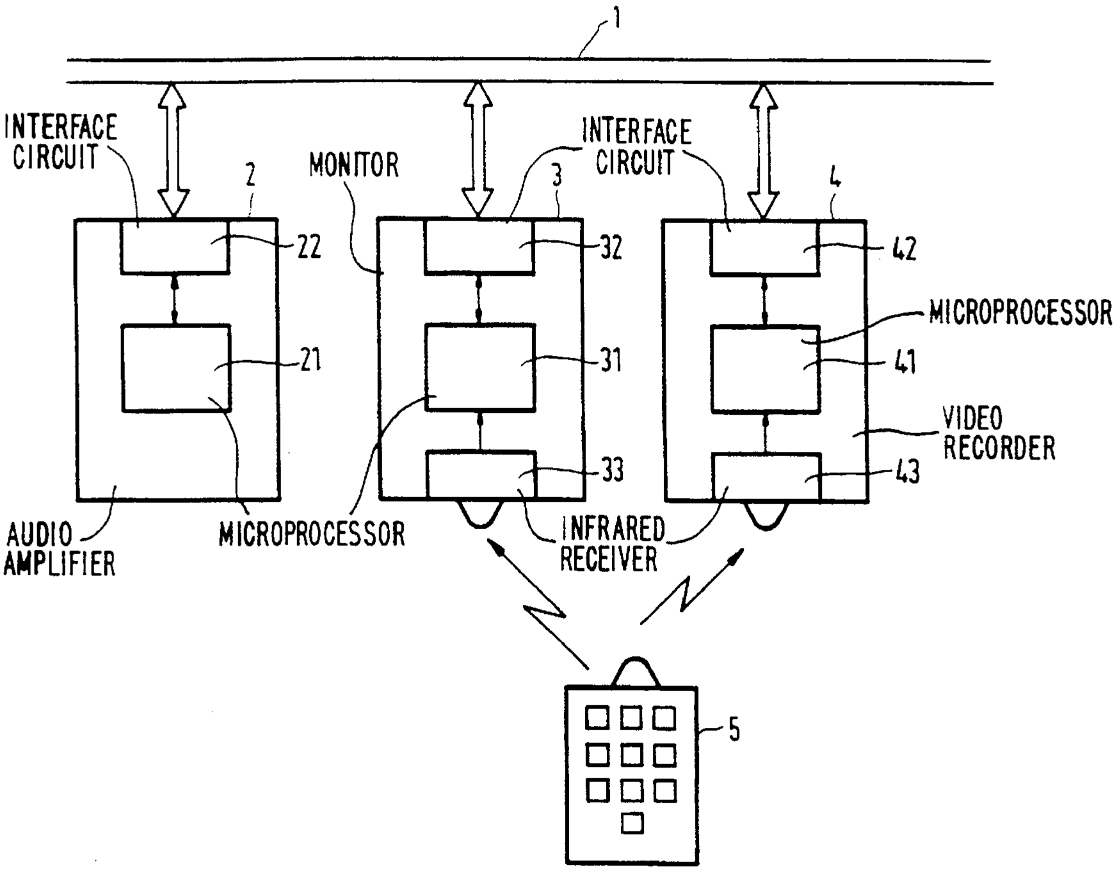
FIG. 1 shows diagrammatically a communication system in which the method according to the invention is used.

FIG. 1 shows diagrammatically a communication system. The system includes a communication bus 1 for transmitting control instructions. In this case three apparatuses 2, 3 and 4 are connected to this communication bus. The apparatuses may be simple or complicated, for example, a television apparatus, a recorder, a washing machine, a microwave oven, a luminaire, a sensor for the outside temperature, etc. The function of the apparatus is controlled by a local microprocessor 21, 31 and 41. The microprocessor comprises in further known manner a ROM for storing a control program and a RAM for storing variable dam. For receiving control instructions from other apparatuses and for transmitting control instructions to other apparatuses, the microprocessor in each apparatus is coupled to the communication bus 1 by an interface circuit 22, 32 and 42. Such an interface circuit is, for example, the integrated circuit SAx1235 of the firm of Philips. In the apparatuses 3 and 4 the microprocessor is also coupled to an infrared receiver 33 and 43 for receiving operating commands which are generated by a remote control unit 5.

Figure 2:
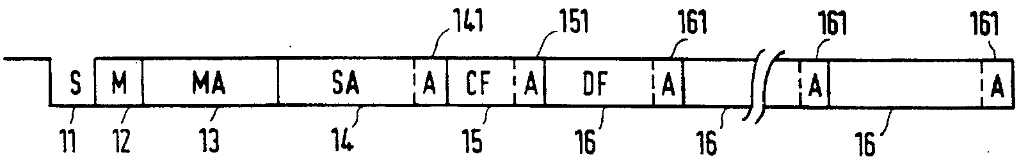
FIG. 2 shows the structure of a message transmitted via the communication bus shown in FIG. 1.

FIG. 2 shows the structure an information level of a message transmitted via the communication bus. For a detailed description at bit level, reference is made to the Reference stated in the opening paragraph. The message shown in FIG. 2 comprises a start bit 11, a mode field 12, a master address 13, a slave address 14, a control field 15 and one or more data fields 16. The mode field 12 indicates the bit rate with which the message is transmitted. The master address 13 comprises 12 bits and identifies the apparatus at whose initiative the message is transmitted. This apparatus is referred to as the master station. The slave address 14 also comprises 12 bits and indicates the addressed apparatus. This apparatus is referred to a slave station. The control field 15 describes the nature of the message and indicates, inter alia, whether the message comprises a read or a write operation. It is to be noted that the master station and the slave station can both transmit and receive. It will hereinafter be assumed that the master station operates as a transmitter and the slave station operates as a receiver. The data fields 16 comprise 8 bits each and indicate the control instruction to be transmitted. Each data field is terminated by a bit (not shown) indicating whether the corresponding data field is the last of the message.

If a plurality of apparatuses is to use the communication bus simultaneously or substantially simultaneously, an arbitration procedure will be carried out. Briefly summarized, the substance of this procedure is that during the transmission of the start bit, the mode field and the master address a master station checks whether each transmitted bit is actually put on the bus. If this is not the case, the relevant master station will withdraw. The arbitration procedure results in only one master station being active after the master address has been transmitted. Other master stations will wait until the end of the message and at a later stage they will make another attempt to use the bus. The remaining master station now transmits the slave address 14 of the apparatus for which a control instruction is intended. As is shown in FIG. 2, the slave address comprises a space 14 1. If a slave station recognizes its own address, it will transmit an acknowledge bit A in this space. If the master station does not detect this bit A, it means that the slave station is not present or does not function. The message is then immediately ended. In a corresponding way the slave station transmits an acknowledge bit in a space 151 after recognition of the control field 15 and in a space 161 after correct reception of each data field 16.

Figure 3:
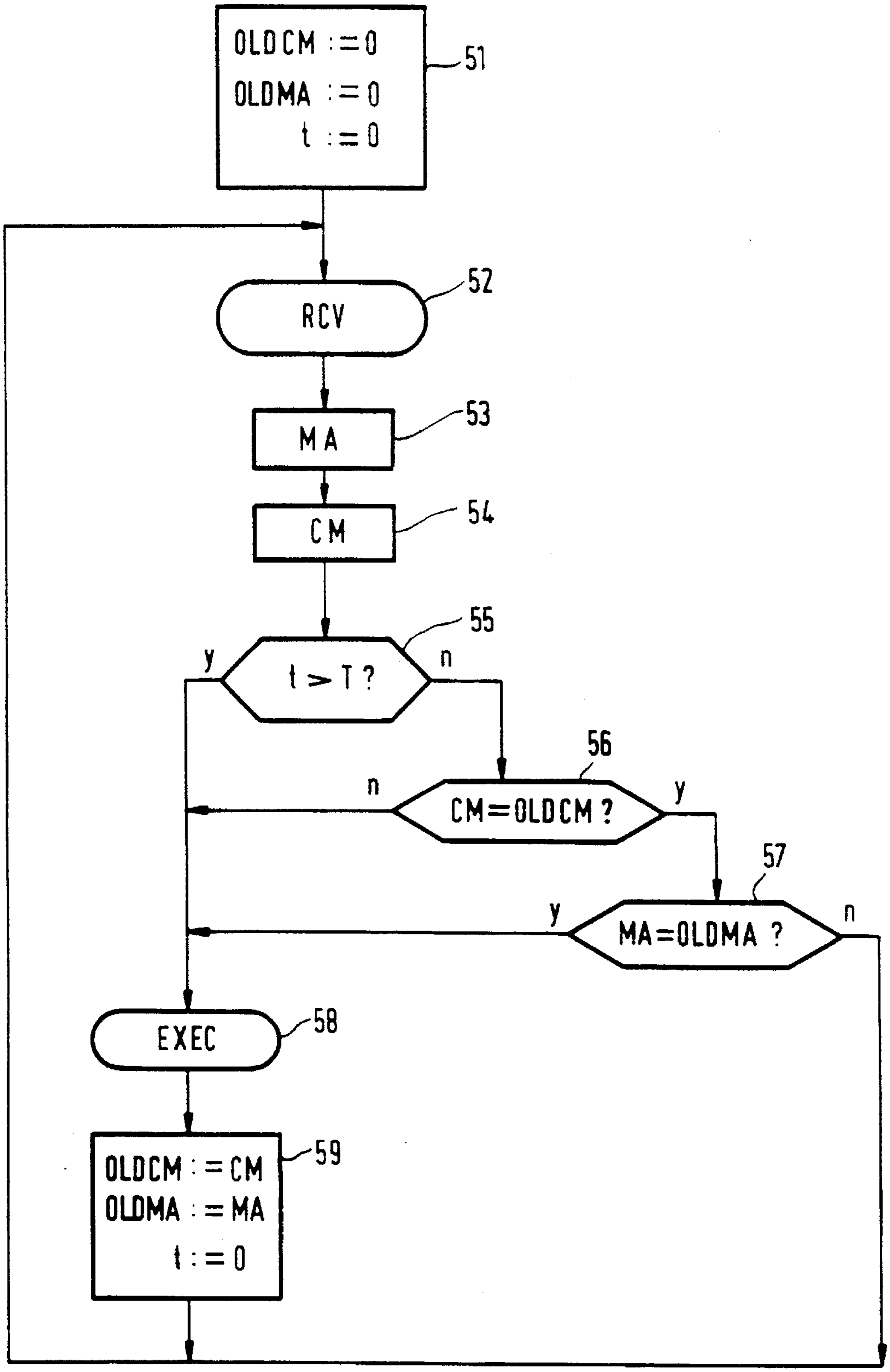
FIG. 3 shows a flow chart of a control program performed by a control circuit shown in FIG. 1.

FIG. 3 shows a flow chart of a control program performed by the microprocessor in each apparatus. In a step 51 of this control program, which step is performed when the apparatus is switched on, an initial value is assigned to a number of variables in the RAM of the microprocessor. An instruction code OLDCM is intended to keep a record of the last control instruction performed by the apparatus. A source code OLDMA is intended to keep a record of the apparatus from which the last performed control instruction was received. In the initial step 51 the two variables acquire a pseudo-value, for example, the value of zero so as to indicate that no control instructions have been received yet. A counter t has the initial value of zero. This counter represents an elapsed time which is autonomically increased by the microprocessor.

In a sub-program RCV, which is denoted by the reference numeral 52, it is subsequently checked whether the apparatus is addressed by one of the other apparatuses via the communication bus. As previously noted, the slave address (14 in FIG. 2) is to this end compared with the own address of the apparatus and in the case of recognition the acknowledge bit A is transmitted. Subsequently, in a step 53, the received master address (13 in FIG. 2) is stored in a variable which will be denoted by MA. Finally, the data fields (16 in FIG. 2) are read in a step 54. These data fields constitute the actual control instruction which must be carried out by the addressed apparatus. The control instruction thus received is provisionally stored in a variable which will be denoted by CM.

In a step 55 the count of the counter t is compared with a predetermined value T. If the value of t exceeds T, a predetermined period of time, for example, 1 second has elapsed and a sub-program 58 is performed. The sub-program 58 comprises the actual performance of the control instruction and is separately specified for each apparatus. Subsequently, the step 59 is performed. In this step a value which is representative of the performed control instruction is assigned to the instruction code OLDCM. Moreover, the master address MA, which identifies the transmitter of the control instruction, is stored in the source code OLDMA. Finally, the value of zero is assigned to the counter t. Thereafter the control program returns to the sub-program 52 to check whether more control instructions are received.

If it has been determined in the step 55 that the predetermined period of time T has not elapsed yet when a control instruction is received, it is checked in a step 56 whether the received control instruction CM is equal to the previously executed control instruction OLDCM. If this is not the case, the control instruction in the subprogram 58 is executed. If the two control instructions are equal, it is checked in a step 57 whether both of them have been transmitted by the same apparatus. To this end the master address MA in the received message is compared in the step 57 with the master address of the previously performed instruction stored in the source code OLDMA. If the two addresses are equal, the control instruction is executed. However, if the control instruction originates from another apparatus, the instruction will not be carried out.

Figure 4:
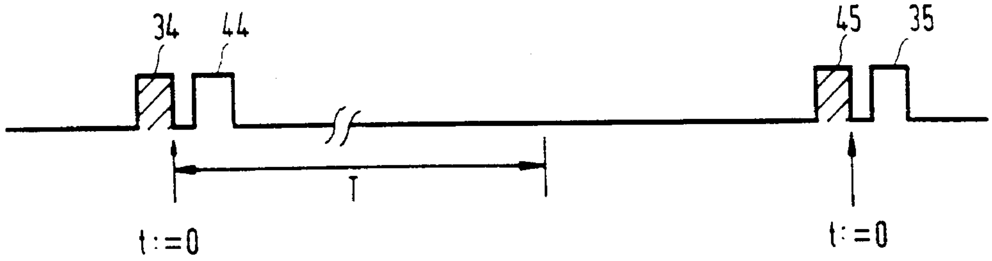
FIGS. 4 and 5 show examples of some messages occurring on the communication bus.

The control program described hereinbefore will now be used in the communication system shown in FIG. 1. To this end it is assumed that apparatus 2 in FIG. 1 is an audio amplifier, apparatus 3 is a television monitor and apparatus 4 is a video recorder. The monitor 3 and the video recorder 4 receive an infrared command "volume up" from the remote control unit 5. They cannot carry out this command themselves and have been programmed in a previously performed installation phase to pass on sound control commands to the audio amplifier 2 via the communication bus 1. FIG. 4 diagrammatically shows in a time sequence the messages which occur at the communication bus in response to the "volume up" command. More particularly, FIG. 4 shows a control instruction 34 from monitor 3 to amplifier 2 and a control instruction 44 from video recorder 4 to amplifier 2. As has been shown in the Figure, the control instruction 34 is the first to be transmitted because monitor 3 has won the arbitration procedure. Both control instructions indicate that the sound volume must be raised by one step. The audio amplifier will now execute control instruction 34, which is shown in a shaded form in the Figure. The control instruction 44 is not carried out because it relates to an identical control instruction which has been received within the predetermined period of time T after the instruction 34 has been carried out. The volume is therefore raised by one step, which is in conformity with the "volume up" command generated once. If the same command is generated again some time later, the audio amplifier will again receive two control instructions. In the Figure the new control instruction from the monitor is denoted by 35 and the new control instruction from the video recorder is denoted by 45. As indicated in FIG. 4, the video recorder won the arbitration procedure, so the audio amplifier will receive the control instruction 45 first. Now, the audio amplifier will perform the control instruction 45 from the video recorder, which instruction is shaded in the Figure. The control instruction 35 from the monitor is now ignored. The sound volume is again raised by not more than one step.

Figure 5:
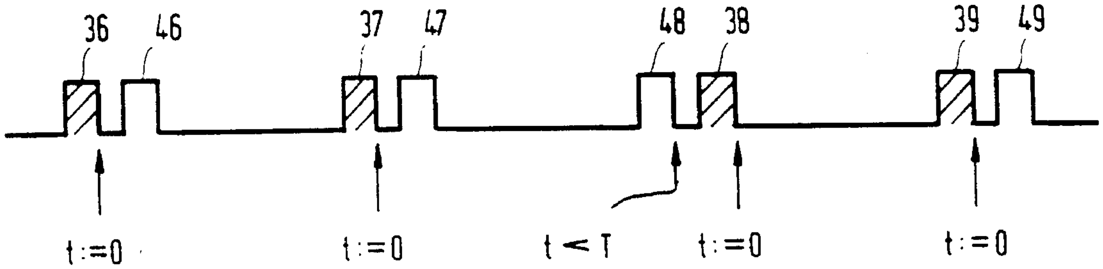

FIG. 5 diagrammatically shows in a time sequence the messages which occur on the communication bus if the "volume up" key on the remote control unit 5 (see FIG. 1) is kept depressed. In this situation the "volume up" command is generated in a repetitive manner with intervals of approximately 100–150 ms. In FIG. 5 the corresponding control instructions from the monitor are denoted by 36–39 and the control instructions from the video recorder are denoted by 46–49. It always depends on the result of the arbitration procedure which instruction is the first to be received by the audio amplifier. The Figure shows that the monitor wins the arbitration, except in the case of control instruction 38 which is preceded by control instruction 48 from the video recorder. As is shown in a shaded form in the Figure, the control instructions 36–39 from the monitor are invariably performed. This also applies to the control instruction 38. The corresponding control instruction 48 from the video recorder is ignored because the predetermined period of time T has not elapsed yet upon its reception.

Figure 6:
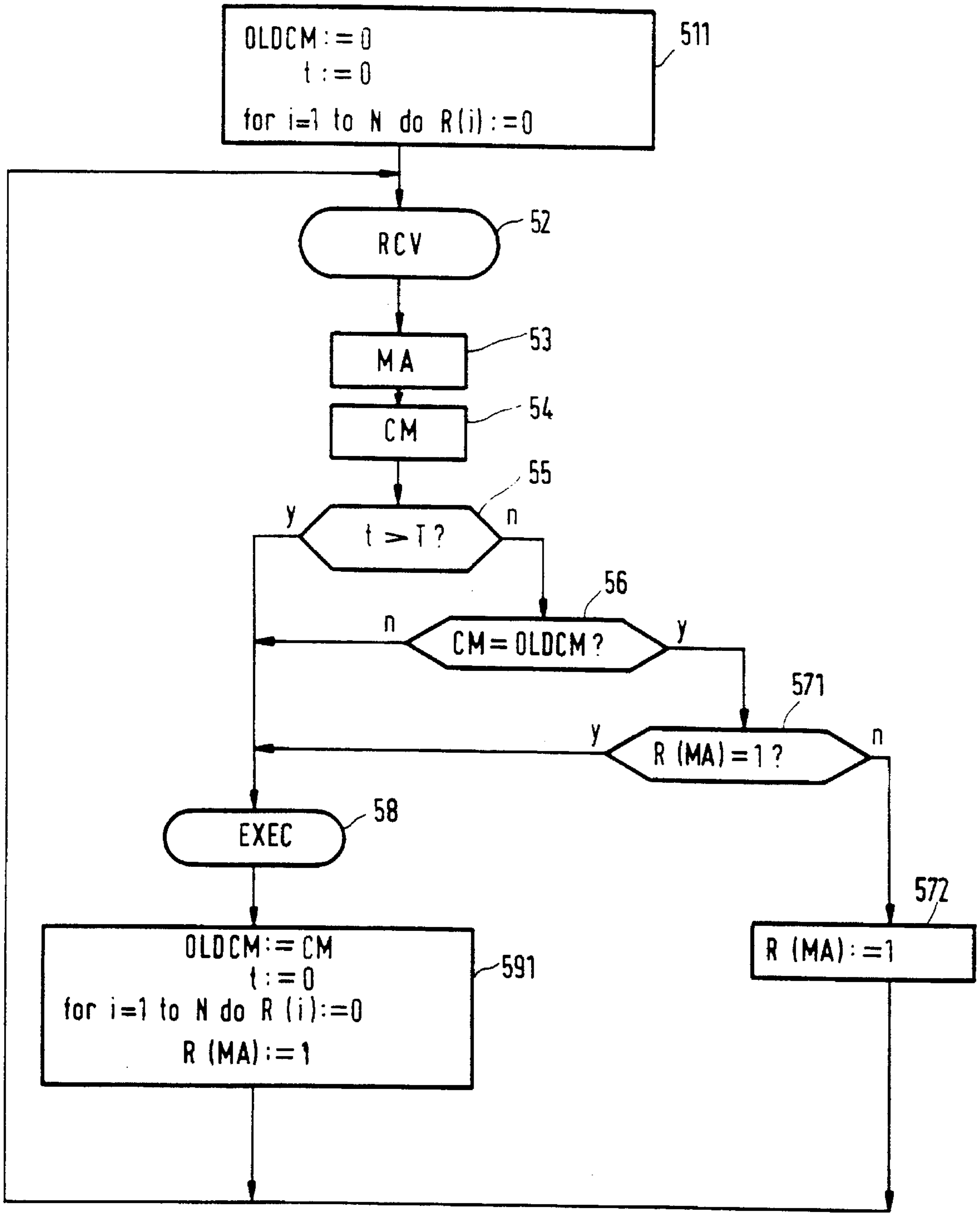
FIG. 6 shows the flow chart of a further example of the control program performed by the control circuit shown in FIG. 1.

FIG. 6 shows the flow chart of another example of the control program. In this Figure identical reference numerals denote the same elements as in FIG. 3. Characteristic of the example of the control program shown in FIG. 6 is the presence of an array R in the RAM of the microprocessor. The array R stores a source code for each apparatus with the master address i in the form of an array element R(i) which can assume the logic value "0" or "1". In the course of the control program the logic value R(i)="0" means that control instructions have not yet been received from the corresponding apparatus with master address i.

An initial step 511, in which, as previously described, a pseudo-value is assigned to the instruction code OLDCM and the value of zero is assigned to the counter t is performed by the control program. Moreover, in the step 511 the logic value of zero is assigned to all source codes R(i) so as to indicate that control instructions have not been received yet. Subsequently, a message is received in a manner already described in the sub-program 52, the master address MA of the source of this message is determined in the step 53 and the control instruction CM is read in the step 54. If the control instruction is actually executed in the sub-program 58, a step 591 is subsequently performed. In this step the current instruction CM is stored in the instruction code OLDCM and the counter is set to zero. More particularly, all source codes R(i) acquire the logic value "0" again after a control instruction has been executed, except for the source code R(MA) which corresponds to the apparatus from which the executed control instruction was received.

When a control instruction is received within a predetermined period of time (determined in step 55) after the previous execution of the same instruction (determined in step 56), step 571 is now performed. In this step 571 it is checked whether the source code R(MA) has the logic value "1". If R(MA) has the logic value "0", the control instruction from the corresponding apparatus has not been received since the last execution. Such an instruction is not executed because the instruction originating from another apparatus has "just" been performed, namely from the apparatus for which currently the source code R(i)=1. In a step 572 the value "1" is assigned to the source code R(MA) so as to establish that the control instruction has been received from this apparatus.

If it has been determined in the step 571 that R(MA) has the value "1", this may have two causes. On the one hand, the control instruction may originate from the apparatus whose previous instruction was performed. On the other hand, the control instruction may originate from an apparatus whose previous instruction was received but ignored. In both cases the control instruction is executed now.

Figure 7:
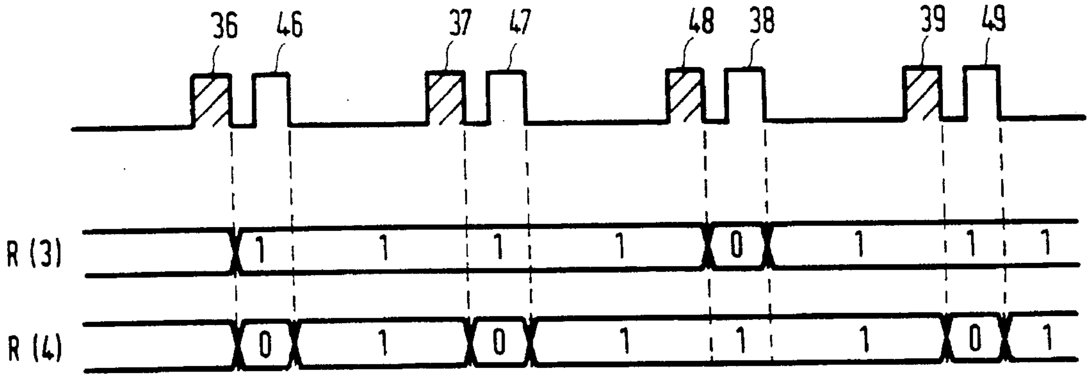
FIG. 7 shows a further example of some messages which occur on the communication bus.

FIG. 7 again shows diagrammatically in a time sequence the repetitive messages occurring on the communication bus if the "volume up" key on the remote control unit 5 (see FIG. 1) is kept depressed. To explain this Figure, the values of the source codes R(3) and R(4) are plotted on the time axis. R(3) corresponds to monitor 3 and R(4) corresponds to video recorder 4. In contrast to FIG. 5, it is apparent from FIG. 7 that control instruction 48 from the video recorder is now executed and that the control instruction 38 from the monitor is ignored. This is accomplished by step 571 of the control program (see FIG. 6). In this step the source code R(4) is detected to have the value "1" when the control instruction 48 is received, which is caused by the fact that a control instruction 47 has already been received before (but not executed at that time) from the video recorder. The audio amplifier thus switches, as it were, temporarily from execution of control instructions from monitor 3 to execution of control instructions from video recorder 4. This is particularly sensible if there were circumstances which would lead to the absence of the control instruction 38. The control instruction 48 from the video recorder is thus executed if the control instruction 38 from the monitor is absent, for example, because the corresponding "volume up" command from the remote control unit has not reached the monitor due to a temporary interruption of the infrared light ray.

It is to be noted that the use of the method according to the invention is not limited to communication systems with a common communication bus. For example, an apparatus may also receive the control instructions from other apparatuses via individual connections. In that case a transmitting apparatus is not identified by a master address which is comprised in a received message, but by the physical location of the connection through which the control instructions are applied. It is also to be noted that not all sources have to be external apparatuses. For example, one of the sources may be accommodated in the apparatus itself and function as a sub-apparatus within this apparatus. An infrared receiver built in an apparatus constitutes a sub-device within the D2B system whose control instructions are equivalent to control instructions from external apparatuses. Such an internal source is not identified by the master address of the apparatus but by a sub-device address which is incorporated in the data fields of a D2B message.

I claim:

1. A method for processing a plurality of control instructions received from at least two sources which are coupled to a communication connection, the control instruction being intended for controlling an apparatus and said method comprising the steps of:

a) receiving and executing a first control instruction from a first source;

b) storing a first instruction code representing said first control instruction and a first source code identifying said first source;

c) receiving a second control instruction from a second source;

d) comparing a second instruction code representing said second control instruction to said first instruction code and, comparing a second source code identifying said second source to said first source code; and e) disregarding said second control instruction if said second source is different than said first source and said second instruction code matches said first instruction code, and executing said second control instruction if said second instruction code is different than said first instruction code or said second source is the same as the first source.

2. The method of claim 1, wherein said second control instruction is executed if the elapsed time between reception of said first control instruction and reception of said second control instruction is at least equal to a predetermined period of time.

3. The method of claim 1 further comprising the steps of:

f) storing said second source code if said second control instruction is not executed; and g) erasing said first source code if said second control instruction is executed.

4. The method of claim 2, further comprising the steps of:

f) storing said second source code if said second control instruction is not executed; and g) erasing said first source code if said second control instruction is executed.

5. An apparatus for processing a plurality of control instructions for controlling the apparatus received from at least two sources which are coupled to a communication connection, said apparatus comprising:

a) means for receiving and executing a first control instruction from a first source;

b) means for storing a first instruction code representing said first control instruction and a first source code identifying said first source;

c) means for receiving a second control instruction from a second source;

d) means for comparing a second instruction code representing said second control instruction to said first instruction code and, comparing a second source code corresponding to said second source to said first source code; and e) means for disregarding execution of said second control instruction if said second source code differs from said first source code and said second instruction code matches said first instruction code, and means for executing said second control instruction if said second instruction code is different than said first instruction code.

6. The apparatus of claim 5, further including means for measuring the elapsed time between reception of said first control instruction and reception of said second control instruction and wherein said second control instruction is executed if the elapsed time between reception of said first control instruction and reception of said second control instruction is at least equal to a predetermined period of time.

7. The apparatus of claim 5, further comprising:

f) means for storing said second source code if said second control instruction is not executed; and g) means for erasing said first source code if said second control instruction is executed.

8. The apparatus as claimed in claim 6, further comprising:

f) means for storing said second source code if said second control instruction is not executed; and g) means for erasing said first source code if said second control instruction is executed.

* * * * *